United States Patent [19]

Adams et al.

[11] Patent Number: 5,039,045

[45] Date of Patent: Aug. 13, 1991

[54] SUCTION CUP FOR USE IN WINDOWS

[75] Inventors: William E. Adams; Marc Peoples, both of Portersville, Pa.

[73] Assignee: Adams Mfg., Portersville, Pa.

[21] Appl. No.: 529,577

[22] Filed: May 29, 1990

[51] Int. Cl.$^5$ ............................................. A45D 42/14
[52] U.S. Cl. .............................. 248/206.2; 248/309.3; 248/363
[58] Field of Search ............... 248/205.5, 205.6, 205.7, 248/205.8, 205.9, 206.1, 206.2, 206.3, 206.4, 363, 362, 309.3; 224/42–45 R; 350/431; 362/307

[56] References Cited

U.S. PATENT DOCUMENTS

| D. 302,107 | 7/1989 | Adams | D8/354 |
|---|---|---|---|
| 1,859,893 | 5/1932 | Ritz-Woller . | |
| 2,055,397 | 9/1936 | Zaiger | 248/206.1 |
| 2,502,714 | 4/1950 | Garnett | 248/206 |
| 3,514,065 | 5/1970 | Litt | 248/206.2 X |
| 4,532,577 | 7/1985 | Shelton | 362/307 X |
| 4,813,640 | 3/1989 | Perentin | 248/205.8 |
| 4,814,960 | 3/1989 | Liu | 362/307 |
| 4,867,402 | 9/1989 | Benson | 248/206.3 |
| 4,933,821 | 6/1990 | Anderson | 362/307 X |

FOREIGN PATENT DOCUMENTS 304491 1/1929 United Kingdom ............. 248/206.1
699748 11/1953 United Kingdom .

OTHER PUBLICATIONS

Product Sheet from Adams Manufacturing titled "Fasteners That Fasten".

Primary Examiner—J. Franklin Foss
Attorney, Agent, or Firm—Buchanan Ingersoll

[57] ABSTRACT

An improved suction cup made of a light transmissive material is provided having a head and a cup portion a concave interior surface adapted to contact a window and an exterior surface opposite said interior surface. A ridge of material is provided along the outer portion of the exterior surface, so that, when the suction cup is in a sealing position, the ridge of material is generally parallel to the mounted surface. In such an arrangement, light passing through the ridge of material continues in a straight path and does not converge at a focal point. Alternatively, surface deformations, such as grooves, circular ridges, dimples, and roughing, may be provided on the exterior surface of the suction cup. These surface deformations diffuse the light passing therethrough, preventing all of the light from converging at a focal point.

7 Claims, 2 Drawing Sheets

SUCTION CUP FOR USE IN WINDOWS

BACKGROUND OF THE INVENTION

1. Field of the Invention

This invention relates to the fields of suction cups and more particularly to the field of transparent and translucent suction cups adapted to be mounted on window surfaces such as those found in an automobile.

2. Background Information

Typical suction cups, whether circular or oval in shape, utilize a concave interior surface which, when mounted upon a surface, evacuates the air from within the cavity and secures the suction cup to the mounted surface by means of vacuum. For ease of manufacture and use, the cross-section of the suction cups is generally tapered toward the edge. Usually, the exterior surface is straight, or, if convex, the convex exterior surface has a greater arc than the concave interior surface. When firmly secured to the mounted surface, the suction cup has a generally frustro-conical cross-section.

The body of the suction cup formed of transparent or translucent plastic which has a concave interior surface may act as a lens which focuses the light passing therethrough at a single point. When attached to the back window of an automobile, the suction cup can under certain circumstances, act like a magnifying glass by converging the sun's rays at a single focal point. When this focal point falls on the fabric or back panel of an automobile, the converged sun's rays will heat up and possibly mar the surface of the fabric. If the right conditions occur, it is possible that the focused rays of the sun might damage the fabric or back panel of the automobile.

SUMMARY OF THE INVENTION

We have found that the problem of the converging rays passing through the suction cup is a function of the frustro-conical shape of the the suction cup cross section. If irregularity is provided to the exterior surface of the suction cup, the problems caused by the converging rays are dissipated. More particularly, we have found that if a ridge of of plastic is provided along the outer rim of the suction cup, the light rays passing through the ridge will be redirected. If the exterior surface of the ridge is generally parallel to the surface upon which the suction cup is mounted, the light rays pass straight through the ridge and do not converge at a focal point. By providing such a ridge along the rim of a suction cup, the problem of the light rays converging at a focal point is significantly minimized.

DESCRIPTION OF THE PREFERRED EMBODIMENTS

Figure 1:
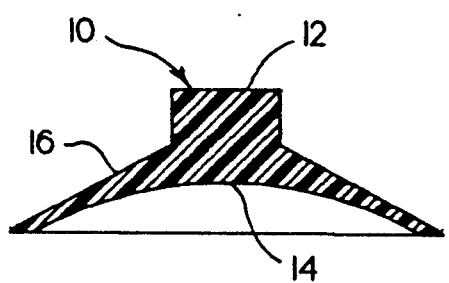
FIG. 1 is a cross-sectional side view of a typical suction cup.
Figure 2:
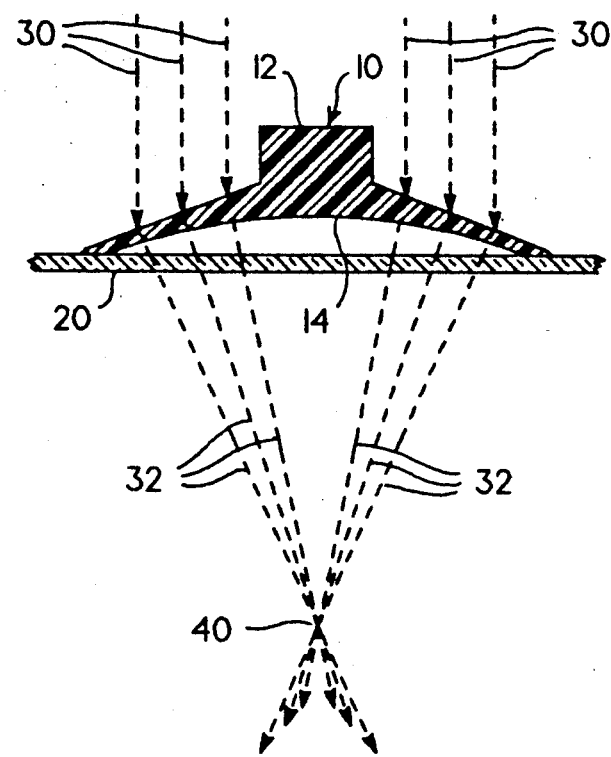
FIG. 2 is a cross-sectional side view of the suction cup of FIG. 1 when mounted on a surface.

FIGS. 1 and 2 show the typical suction cup of the prior art. Suction cup 10 has a head 12 and a cup portion 14 having an interior concave surface and an exterior surface. Commonly, such suction cups are molded from a transparent or translucent plastic such as vinyls. Hereinafter, it should be undestood that the term suction cup refers to those suction cups which are made of a light transmissive material. Cup portion 14 is adapted to mount upon mounted surface 20 as shown in FIG. 2. When mounted on a surface 20, the exterior surface of cup portion 14 has a generally frustro-conical shape illustrated as 16. Light 30 passing through frustro-conical portion 16 follows the path shown in 32 to converge at a focal point 40 some distance from the mounted surface. If focal point 40 coincides at or near a fabric or other flammable surface, the concentrated light rays 30 may singe, melt or damage the fabric or plastic flammable surface.

Figure 4:
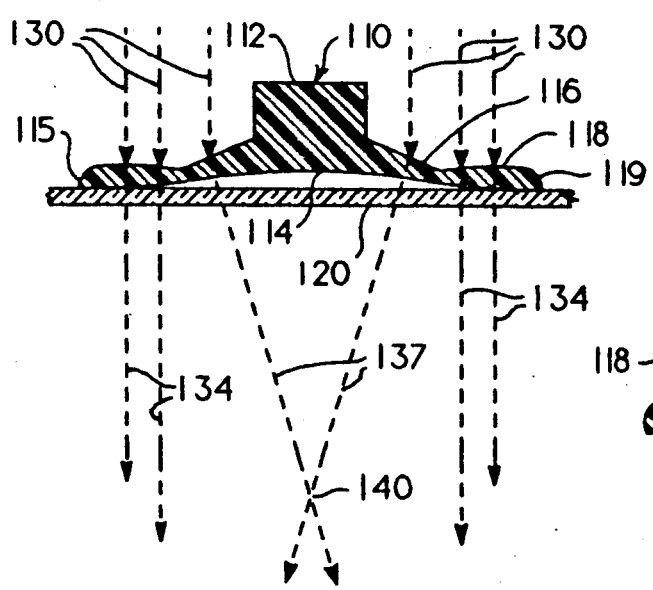
FIG. 4 is a cross-sectional side view of the suction cup of FIG. 3 when mounted on a surface.
Figure 3:
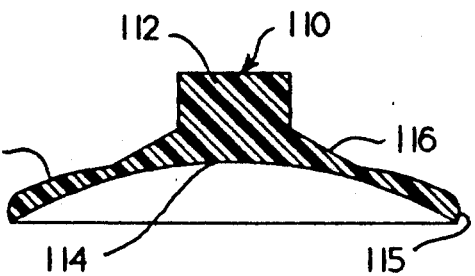
FIG. 3 is a cross-sectional side view of a presently preferred embodiment of the suction cup of the present invention.

FIG. 3 shows the suction cup of FIG. 1 with a present preferred improvement provided thereon. In FIG. 3, suction cup 110 has a head 112 and a cup portion 114 having an interior concave surface and an exterior surface. A ridge of material 118 is provided along the rim 115 of the exterior surface of the cup portion 114 of the suction cup. Preferably, this ridge covers approximately one-half of the exterior surface of the suction cup. When suction cup 110 is depressed and mounted on surface 120 as shown in FIG. 4, ridge 118 is aligned generally parallel to mounted surface 120. In the suction cup embodiment 110 of FIG. 4, frustro-conical section 116 of cup portion 114 is reduced in size. Consequently, converging rays 137 are reduced an amount which corresponds to the size of that ridge 118. We have found that when ridge 118 covers half the outer surface area of the cup body the amount of light 130 being focused is cut 50%. The other 50% of the light passing through suction cup 110 passes straight through as shown in directional lines 134. Alternatively, on larger suction cups, we have found that a tapered cross section that exceeds 3 square inches might, under certain circumstances, focus light rays with enough intensity to possibly mar some surfaces.

We have found that sufficient minimization of the converging light rays 137 can be achieved where ridge 118 extends at least one-third of the radial distance inward from the rim 115 of cup portion 114. A radius 119 is provided along the outer edge of ridge 118, the radius 119 being equivalent to the width of suction cup 110 at the interior portion of ridge 118. The exterior surface of ridge 118 extends from at least one third of the radial distance inward from the rim 115 until it intersects the radius 119 provided on the outer edge of cup portion 114. We have found that a distance of one-quarter inch is a sufficient length for ridge 118 to safely minimize the converging light rays 130 passing through a medium-sized suction cup 110 having a diameter of 1⅜ inches.

One could achieve the same results as suction cup 110 by having an equally-thick flange extend outward from the base of the head 112. However, that configuration would require substantially more plastic and would significantly increase the expense of molding. Because that amount of plastic would take a long time to cool, a suction cup having an equally-thick flange at the base of the head could not be ejected from its mold until after a significant delay. We prefer to make ridge 118 on the rim 115 of cup portion 114 to minimize the amount of plastic required while obtaining the required dispersion of light and get a thick cross-section where the flange meets the head of the cup.

Use of ridge 118 is but one method available to disturb the convergence of light rays at a focal point when passing through a suction cup. Other methods such as surface irregularities or the provision of a square exterior surface parallel at all points to the mounted surface can also be used to minimize the problems caused by the converging light rays at a focal point.

Figure 5:
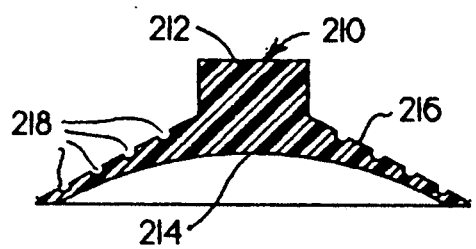
FIG. 5 is a cross-sectional side view of a first alternative embodiment of the suction cup of the present invention.
Figure 6:
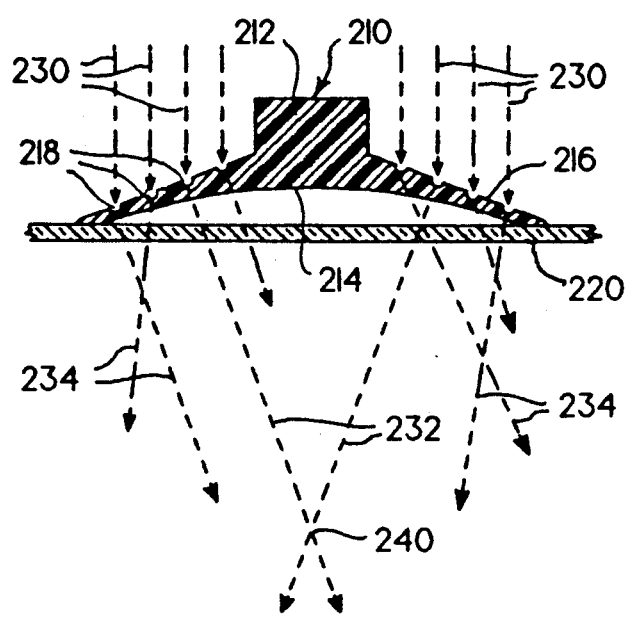
FIG. 6 is a cross-sectional side view of the suction cup of FIG. 5 when mounted on a surface.

FIGS. 5 and 6 show an alternate embodiment of our suction cup. Suction cup 210 has a head 212 and a cup portion 214 having an interior concave surface and an exterior surface. Grooves 218 are provided on frustroconical section 216 of cup portion 214. As shown in FIG. 6, grooves 218 scatter light rays 230 such that a reduced portion of light rays 232 converge at focal point 240. Scattered rays 234 do not converge at focal point 240, thereby obtaining sufficient dispersion of light. However, I have found that the presently preferred embodiment of FIGS. 3 and 4 provides the easiest such suction cup to mold.

Figure 8:
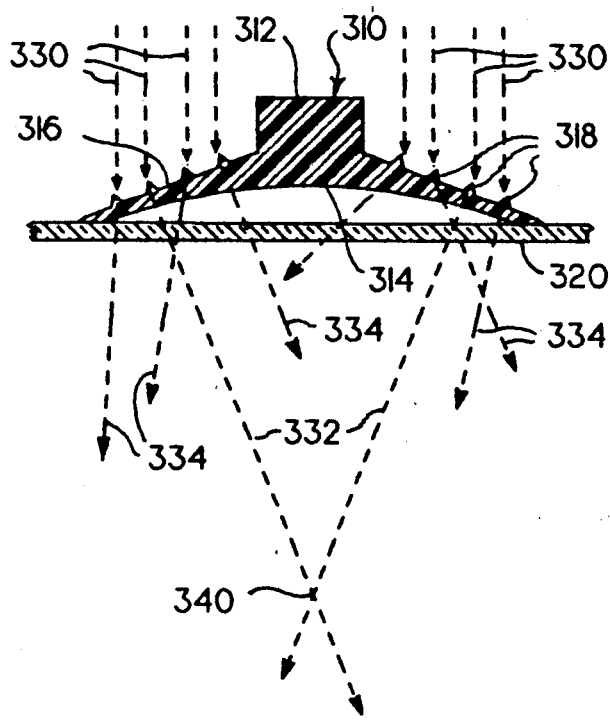
FIG. 8 is a cross-sectional side view of the suction cup of FIG. 6 when mounted on a surface.
Figure 7:
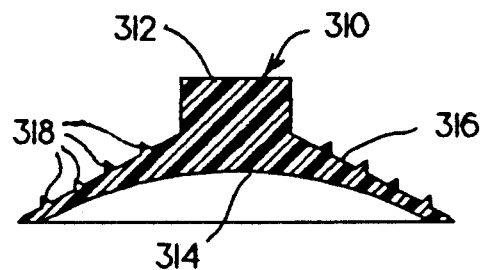
FIG. 7 is a cross-sectional side view of a second alternative embodiment of the suction cup of the present invention.

FIGS. 7 and 8 show another alternate embodiment of our suction cup. Suction cup 310 has a head 312 and a cup portion 314 having an interior concave surface and an exterior surface. Circular ridge 318 are provided on frustoconical section 316 of cup portion 314. As shown in FIG. 8, ridges 318 scatter light rays 330 such that a reduced portion of light rays 332 converge at focal point 340. Scattered rays 334 do not converge at focal point 340, thereby obtaining sufficient dispersion of light. Suction cup 310 can be used when obvious, decorative appearance is not important.

Vapor blasting or roughing of the exterior surface and molding ridges around the cup can be used to defract the light. However, these alterations, like those in FIGS. 5-8, make the suction cup more visible and detract from its appearance.

The suction cup 110 of FIGS. 3 and 4 does not provide a distracting or unsightly surface that can catch dust or be so obvious as to distract attention from the decoration hanging from the suction cup. Suction cup 110 is attractive, removes the possibility of excessive light hitting a focal point, and reduces both material and manufacturing time.

In the foregoing specification certain preferred practices and embodiments of this invention have been set out, however, it will be understood that the invention may be otherwise embodied within the scope of the following claims.

I claim:

1. An improved suction cup made of a light transmissive material, said suction cup having a head, a cup portion having a concave interior surface and an exterior surface opposite said interior surface, said cup portion adapted to contact a mounting surface, said improvement comprising a ridge of material provided on the exterior surface of said cup portion such that light rays passing through said suction cup will not converge at a single focal point, said ridge of material sized and shaped to be generally parallel to said mounting surface when said suction cup is mounted thereon.

2. The improved suction cup of claim 1 wherein said ridge of material is sized to cover approximately one-half of said exterior surface of said cup portion.

3. The improved suction cup of claim 1 wherein an outer portion of said ridge is rounded and has a radius approximately equivalent to the width of said suction cup at a distance of at least one-third of a radial distance inward from an outer edge of said suction cup, said ridge extending inward to intersect the convex exterior surface of said cup portion at a distance of at least one-third of the radial distance inward from said edge.

4. An improved suction cup made of a light transmissive material for attaching to a mounting surface, said suction cup having a head, a cup portion having a concave interior surface and an exterior surface opposite said interior surface, said cup portion adapted to contact said mounting surface, said improvement comprising a plurality of surface deformations provided in said convex exterior surface of said cup portion such that light rays passing through said suction cup will not converge at a single focal point.

5. The improved suction cup of claim 4 wherein said surface deformations are grooves provided in said exterior surface of said cup portion.

6. The improved suction cup of claim 4 wherein said surface deformations are circular ridges provided in said exterior surface of said cup portion.

7. The improved suction cup of claim 4 wherein said surface deformations are the result of roughing said exterior surface of said cup portion.

* * * * *